United States Patent [19]

Miyagawa

[11] 3,739,697
[45] June 19, 1973

[54] DATA RECORDING DEVICE FOR USE WITH CAMERAS
[75] Inventor: Fumihiro Miyagawa, Tokyo, Japan
[73] Assignee: Ricoh Co., Ltd., Tokyo, Japan
[22] Filed: Mar. 29, 1972
[21] Appl. No.: 239,205

[30] Foreign Application Priority Data
Mar. 31, 1971 Japan.............................. 46/22563

[52] U.S. Cl.................................. 95/1.1, 346/107
[51] Int. Cl. ......................................... G03b 17/24
[58] Field of Search....................... 95/1.1; 346/107

[56] References Cited
UNITED STATES PATENTS
3,111,886  11/1963  Berning................................. 95/1.1
3,263,581  8/1966   Linderman............................. 95/1.1
3,522,611  8/1970   Maronde.............................. 346/107

Primary Examiner—John M. Horan
Attorney—Henry T. Burke, Robert Scobey and Robert S. Dunham et al.

[57] ABSTRACT

A data recording device for incorporation in a camera which enables appropriate data associated with a particular subject to be recorded in the same frame on a film or at an appropriate position outside of the frame on the film in the camera by removably inserting therein a data capsule including data rings bearing the data to be recorded. The selected data are illuminated by means within the capsule and projected onto the film through a projection lens located in the camera body. This projection lens is automatically covered or sealed by a mirror on a spring-loaded lever when the data capsule is removed from the camera so that external light is prevented from entering the projection lens and passing onto the film. On the other hand, the projection lens is automatically uncovered to project the selected data which is reflected by the mirror when the data capsule is inserted into the camera.

8 Claims, 5 Drawing Figures

Patented June 19, 1973 3,739,697

DATA RECORDING DEVICE FOR USE WITH CAMERAS

BACKGROUND OF THE INVENTION

The present invention relates generally to a data recording device for use in a camera, and more particularly to a camera in which a data capsule, having appropriate data to be recorded on the film, may be removably inserted so that the data may be projected and recorded on the film.

There have been proposed cameras of a type containing a source of data which may be selected from the exterior of the camera, a projection lens for projecting the selected data onto a film, and a light source for illuminating the selected data, all of which are incorporated in the camera so that when required the light source is energized to illuminate and project the selected data onto the same frame or outside of the frame on the film. However, it is impossible for such cameras to record on the film any other data except that built-in such as the date when a subject is photographed. Furthermore, it is extremely difficult to incorporate the data recording device into the limited space within the camera, and the cameras incorporating such data recording devices become inevitably high in cost. In prior art cameras of the type described, when the light source and circuit is disconnected, upon failing to function, the cameras must be disassembled for repair or replacement so that they cannot be used for photography.

SUMMARY OF THE INVENTION

The present invention therefore provides a camera capable of recording on a film any selected data together with the subject by inserting a separate data capsule, bearing various data as desired, into the camera body. The data capsule comprises a plurality of data rings upon each of whose circumferences are located data, and means by which the desired data may be selected and located at a projection position when the data rings are rotated, and illuminated and projected through a projection lens in the camera body onto a film in the camera.

The film chamber and the capsule chamber into which the data capsule is inserted are optically isolated in the camera body and the projection lens may be covered with a cover means which includes a reflecting mirror. When the capsule is inserted into the camera, the cover means is automatically moved away from the optical path to the projection lens and the reflecting mirror is located in a position for redirecting the data carrying light beam toward the projection lens. On the other hand, when the capsule is removed from the camera, the cover means is returned such that the reflecting mirror automatically covers the projection lens to prevent any external light from entering through the projection lens to expose the film.

The data capsule used in the present invention not only incorporates means bearing data to be recorded, means for selecting the desired data, and means for illuminating the selected data, but also a power source for the illumination means, and circuit means for controlling the illumination means.

The above and other features and advantages of the present invention will become more apparent from the following description of the preferred embodiment thereof taken in conjunction with the accompanying drawings.

DESCRIPTION OF THE PREFERRED EMBODIMENT

Figure 1:
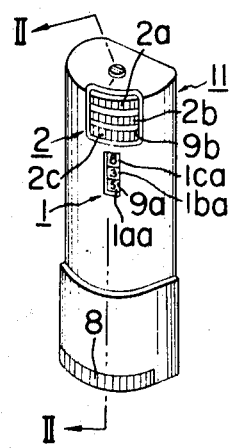
FIG. 1 is a perspective view of a data capsule in accordance with the present invention.
Figure 2:
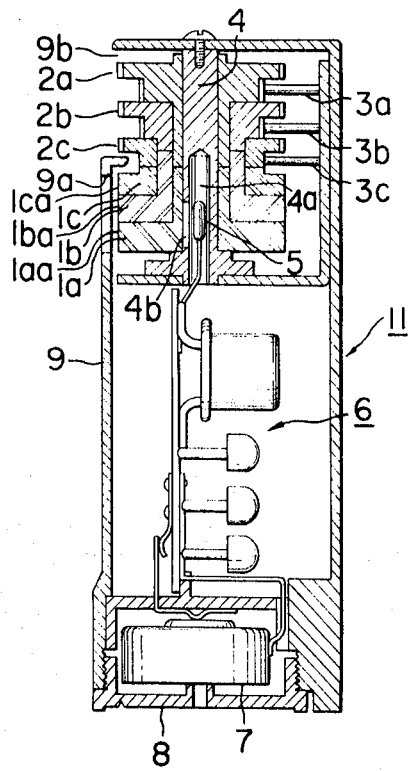
FIG. 2 is a longitudinal sectional view taken along the line II—II of FIG. 1.

Referring to FIGS. 1 and 2, a data capsule generally designated by 11 is shown comprising three data rings 1a, 1b and 1c which are made of a transparent material such as synthetic resins and rotatable integrally with knurled settings rings 2a, 2b and 2c. These data rings 1a–1c are rotatably fitted over a shaft 4, and are provided with click springs 3a, 3b and 3c which serve to securely maintain the data rings 1a–1c in desired position. The data rings 1a–1c have a plurality of positions for digits representative of, for example, the year, the month and the day, that is, the date when a picture is taken, and may be turned to any number of positions by the setting rings 2a–2c. A light bulb 5 is located inside a hollow portion 4a in the shaft 4 in order to illuminate, through an opening 4b formed in the shaft 4, the selected numbers around the circumferences of the data rings 1a–1c.

Figure 4:
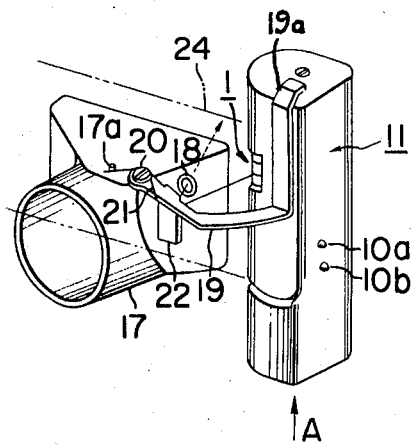
FIG. 4 is a perspective view illustrating the relation between the data capsule inserted into the camera and the data recording means disposed in the camera body.
Figure 5:
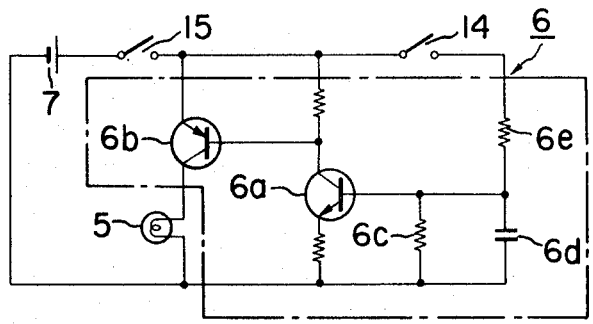
FIG. 5 is a diagram of an electric circuit for the data recording device of the present invention.

In the lower portion of the capsule casing 9 is disposed a lighting control circuit which is a switching circuit 6, comprising two transistors 6a, and 6b, a capacitor 6d, and resistors 6c and 6e (enclosed in the chain lines in FIG. 5). The data capsule 11 further contains a battery 7 enclosed in the bottom portion thereof and covered with a cover 8, and has a pair of terminals 10a and 10b of the control circuit 6 projecting from the casing 9 (See FIG. 4).

As best shown in FIG. 1, the setting rings 2a–2c have their circumferences partly exposed through an opening 9b so that they may be selectively turned by a finger in order to expose and project the desired numbers on the circumferences of the data rings 1a–1c through an opening 9a.

Figure 3:
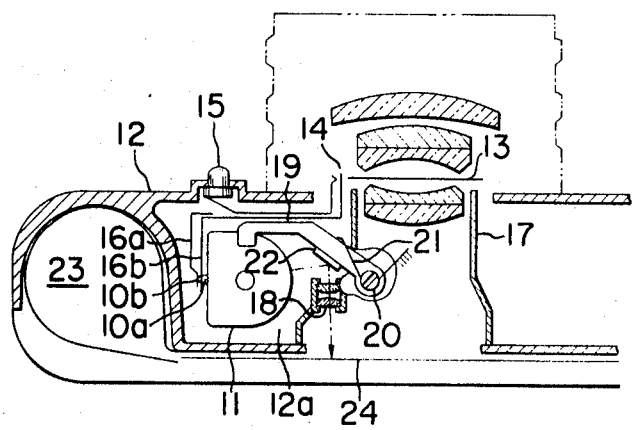
FIG. 3 is a fragmentary cross sectional view of a camera in accordance with the present invention.

Next referring to FIGS. 3 and 4, the components of camera body 12 which are associated with the present invention will be described. The camera body 12 is shown as comprising a capsule chamber 12a into which is inserted the capsule 11, a shutter 13, an X synchronizing contact switch 14 for flash photography, a switch 15 disposed on the front side of the camera body 12 as best shown in FIG. 3, and a pair of contacts 16a and 16b which are positioned to contact the terminals 10a and 10b on the side of the capsule 11 when the latter is mounted into the camera body 12 so that the series-connected switches 14 and 15 may be connected to the switching circuit 6 as shown in FIG. 5

Next referring to FIG. 5, the mode of operation of the lighting control circuit will be described. When the switch 15 is closed or ON while the switch 14 is opened or OFF, the capacitor 6d discharges through the resistor 6c so that the transistors 6a and 6b are cut off. As a result, the lamp 5 is OFF. When the switch 14 is closed or ON while the switch 15 remains closed or ON, the capacitor 6d is charged through the resistor 6e and when the voltage across the capacitor 6d reaches a predetermined magnitude, both transistors 6a and 6b begin conducting and are switched ON, so that the lamp 5 is turned ON. When the switch 14 is opened or OFF, the capacitor 6d discharges through the resistor 6c so that the transistors 6a and 6b are cut off or OFF after about 30 msec. As a result, the lamp 5 is turned off.

Referring again to FIGS. 3 and 4, the camera body 12 further comprises a light shielding tube 17 and a connecting lever 19, which is pivoted to the upper side of the light shielding tube 17 by a pivot 20 and is normally biased to rotate in the counterclockwise direction under the force of a spring 21 loaded between the lever 19 and a pin 17a, and on which is mounted a reflecting mirror 22. When the capsule 11 is inserted into the camera body 12 from the underside thereof in the direction indicated by the arrow A in FIG. 4, the connecting lever 19 is caused, against the action ofspring 21, to rotate in the clockwise direction to the position shown in FIG. 4 so that the numbers on the data rings 1a–1c may be projected onto a film 24 through the reflecting mirror 22, and fixed projection lens 18. On the other hand, when the capsule 11 is removed from the camera body 12, the connecting lever 19 is rotated in the counterclockwise direction under the force of the spring 21 so that the reflecting mirror 22 covers or shields the projection lens 18. Consequently no light is permitted to enter into the light shielding tube 17 through the projection lens 18 from the exterior. In the instant embodiment, a rolled film 24 encased in a cassettte 23 is used.

Next the general mode of operation will be described. First the desired numbers on the circumferences of the data rings 1a–1c are selected and located in the opening 9a by turning the associated setting rings 2a–2c by a finger. Next the capsule 11 is mounted into the capsule chamber 12a of the camera body 12 in the manner described above so that the pair of terminals 10a and 10b on the side of the capsule 11 are made to contact the pair of contacts 16a and 16b on the side of the camera body 12. The connecting lever 19 is caused to rotate a predetermined distance in the clockwise direction against the spring 21, as the inclined portion 19a on the upper end of lever 19 is contacted by and rides on the upper edge of the casing 9 of the capsule 11 as shown in FIG. 4. As a result, the reflecting mirror 22 is moved to the operative position where it reflects the light beam from the lamp 5 through the opening 9b toward the projection lens 18. With this arrangement no light from the exterior of the camera will be permitted to enter the camera body 12 as the capsule 11 is closely fitted into the capsule chamber 12a and the mirror 22 is not moved from its covering position until the capsule 11 is almost fully inserted. After the capsule 11 is mounted into the camera body 12 held therein by any suitable stop means, the operator releases the shutter while depressing the switch 15. When the shutter blade 13 is wide open, the X synchronizing contact switch 14 is closed to establish the lighting control circuit (See FIG. 5) thereby turning on the lamp 5. Consequently, the selected numbers on the data rings 1a–1c are projected ono the film 24 positioned in the camera film plane through the opening 9b, the reflecting mirror 22 and the projection lens 18.

When the capsule 11 is removed from the camera body 12, the tab portion 19a on the connecting lever 19 is released from contact with the upper edge of the capsule casing 9 and the lever 19 is rotated in the counterclockwise direction under the force of the spring 21 so that the reflecting mirror 22 immediately shields the projection lens 18 in the manner described hereinbefore. As a result, the light from the exterior of the camera body 12 will not enter into the light shielding tube 17 so that undesirable exposure of the film 24 may be positively prevented.

In the instant embodiment, use is made of the reflecting mirror 22 for projecting the desired data, the numerals on the data rings 1a–1c, and recording them on the film. However, it will be clear to those skilled in the art that the projection lens shielding member need not be a reflecting mirror if the capsule 11 and projection lens structure is so modified that the opening 9b is directly aligned with the projection lens 18. In such case lever 19 and tab 19a will be suitably modified so as to still provide for immediate shielding or closing off of the projection lens 18 when the capsule 11 is removed from the camera body.

According to the present invention, undesirable exposure of the film by the light passing through the projection lens can be positively prevented. Another advantage of the present invention is that depending upon the desired data to be recorded, an appropriate data capsule may be selected from various data capsules. A further advantage is that even in case of the malfunction of the inserted capsule due to the disconnection of the lighting control circuit, the camera may be used for the desired photography without the least inconvenience.

According to the present invention, the data rings, the light source or lamp for projecting the data to be recorded, and the lighting control circuit are incorporated not in the camera body, but in the data capsule which may be removably inserted into the camera body so that various data rings may be used with ease.

What is claimed is:

1. A data recording device for use with a camera of the type having:
   a camera body with an interior film plane;
   shutter means for controlling the admittance of light to said film plane;
   signal means actuated by said shutter means to produce a signal when said shutter means is opened;
   wherein the improvement comprises a combination of:
   a data capsule including:
      means for providing indicative data;
      means for illuminating said indicative data;
   means in said camera body defining a receptacle for said data capsule including:
      means for admitting illuminating light from said indicative data onto said film plane;
      means for shielding said light admitting means in the absence of said data capsule in said receptacle comprising a reflecting mirror for redirecting illuminating light from said indicative data through said light admitting means;
      means actuated by the insertion of said data capsule into said receptacle for displacing said shielding means to admit illuminating light from said indicative data to said film plane through said light admitting means; and means for actuating said illuminating means in response to a signal from said signal means when said data capsule is in said receptacle such that illuminating light from said indicative data is admitted to said film plane when said shutter means is opened.

2. A device as in claim 1 wherein said means for providing indicative data comprises:

a rotatable data ring member having indicia marked on its circumference;

a window in said data capsule through which a portion of said indicia can be viewed;

a rotatable setting ring member connected to said data ring member for rotation therewith such that the portion of said indicia viewable through said window can be changed by a rotation of said setting ring member.

3. A device as in claim 2 wherein said data ring member is of translucent material and said illuminating means is positioned to project light through its circumference and out said window.

4. A device as in claim 1 wherein said means for illuminating said indicative data comprises:

a lamp;

a power source for lighting said lamp; and a circuit for controlling the supply of power from said power source to said lamp.

5. A device as in claim 4 wherein said means for actuating said illuminating means comprises:

a first contact means in said camera body connected to said signal means; and second contact means in said data capsule cooperating with said first contact means when said data capsule is inserted in said receptacle for connecting said signal means to said circuit.

6. A device as in claim 5 including means on said camera body for opening the connection between said first contact means and said signal means.

7. A device as in claim 1 wherein said means for displacing said shielding means comprises spring-loaded lever means having means thereon engagable by said data capsule for displacing said lever means.

8. A device as in claim 7 wherein said shielding means is mounted on said lever means.

* * * * *